United States Patent Office 3,538,012
Patented Nov. 3, 1970

3,538,012
SOLIDS CONTAINING ALKALI METAL HYDROXIDE HYDRATE AND ALKALI METAL BOROHYDRIDES
Dieter Goerrig, Lohmar, Siegkreis, Germany
No Drawing. Filed Mar. 30, 1967, Ser. No. 626,929
Claims priority, application Germany, Apr. 2, 1966,
G 46,496
Int. Cl. C01b 6/14; C09k 3/00
U.S. Cl. 252—188
7 Claims

ABSTRACT OF THE DISCLOSURE

A solid composition of 1 to 50 percent of an alkali metal borohydride in the form of crystals dispersed in a solid water-soluble matrix comprising an alkali metal hydroxide hydrate.

---

Alkali metal borohydrides are excellent reducing agents under certain conditions. In particular, they can be used to great industrial advantage for the reduction of vat dyestuffs and thus, in particular, in dyeing processes with vat dyes. In general, it is, however, necessary, in the case of this purpose of use, to use alkali and catalysts simultaneously with the borohydride.

For a description of the prior art and of the literature known up to the present time in this field, reference may be had here to the applicant's article, "Alkali Boranates As Reducing Agents for Vat Dyes and Other Compounds," published in "Melliands Textilberichte," 1963, Issues 8 and 9.

In order to explain the problem of the present invention, it will be sufficient here to take a single example:

One very important industrial method of dyeing is continuous piece goods dyeing by heating in a steamer cotton goods which have been previously pigment-padded, dried and again impregnated with a solution of chemicals.

The solution of chemicals in accordance with the prior art consists, for a deep dyeing, for instance, of an aqueous solution of 60 g./l. $Na_2S_2O_4$ and 60 g./l. NaOH.

In accordance with the recent art, results which are at least just as good are obtained with an aqueous solution of 1 g./l. $NaBH_4$, 0.7 g./l. $Na_2Ni(CN)_4$, 8 g./l. $CH_2OH \cdot SO_2Na \cdot 2H_2O$, and 15 g./l. NaOH.

The more recent prior art therefore provides great economic advantages. However—and the above example clearly shows this—it has a technical disadvantage insofar as the number of different components of the aqueous solution is twice as great as in the old process.

This disadvantage would naturally be remedied immediately if one could combine several of the above components with each other in a commercial product and if this commercial product would have the necessary stability and other requirements.

There has been no lack of attempts directed at this. Thus, for instance, dry sodium or potassium borohydride has been mixed together with inorganic catalysts and salts or with organic catalysts or with inorganic catalysts and organic catalysts. The stability of these mixtures, however, left much to be desired; on particular economic drawback was the fact that it was necessary to use anhydrous solid alkali metal borohydride which is as pure as possible.

On the other hand, one has, of course, also attempted merely to mix the catalysts, but then the disadvantage remained that borohydride and catalysts again had to be used separately.

The NaOH in all of these cases had to be used in separate form. On the other hand, the borohydride could be used also in the form of aqueous solutions which already contained alkali. There are of industrial interest in particular those solutions which, in addition to NaOH or silicates, contain, for instance, 10 to 12% $NaBH_4$, together with, for instance, 30 or 50% NaOH or $Na_2SiO_3$. These solutions are stable if, while containing a large amount of alkali, they contain no catalyst.

If, however, as in the above example, 15 parts of NaOH were mixed with 1 part of $NaBH_4$ in the form of these solutions, there would result, with respect to the amount of borohydride obtained, uneconomically large quantities for transportation and cost of transportation, since, in order to obtain a solution, more than 15 parts $H_2O$ would still be necessary.

The use of 10% $NaBH_4$ solutions, however, makes it possible to obtain great economic advantages, since borohydride solutions which contain, for instance, 3 parts of NaOH or $Na_2SiO_3$ per part of $NaBH_4$ can be prepared considerably more easily and thus more cheaply than the solid pure $NaBH_4$ or $KBH_4$.

Thus, until recently, when using such a solution, there was employed in the most favorable case as additional components (in the above example) an

$$Na_2Ni(Cn)_4 — CH_2OH \cdot SO_2Na \cdot 2H_2O$$

mixture an additional alkali and therefore a total of 3 components.

The present invention solves the problem of the combining of a plurality of components in a surprising manner which affords very great advantages.

The basic concept of the present invetion resides in converting the alkali hydroxide—or at least a part thereof—into the alkali hydroxide monohydrate and utilizing the chemical and physical properties thereof which are surprisingly suitable for the present purpose.

Sodium hydroxide monohydrate melts at about 64° C. At this temperature, it dissolves some $NaBH_4$; upon an increase in the temperature, the dissolving power for $NaBH_4$ increases very rapidly. Surprisingly, even at very high temperatures, such as 150° C. or 200° C., the solutions of $NaBH_4$ in $NaOH \cdot H_2O$ are extremely stable. Upon cooling a hot-saturated $NaBH_4$ solution in $NaOH \cdot H_2O$ to somewhat above 64° C., the main portion of the dissolved $NaBH_4$ precipitates out in the form of beautiful crystals which are suspended in the melt. Many other substances are also readily soluble in the hot melt and deposit out in part upon cooling in the form of easily suspended crystals. Such substances include also catalysts of the type of $Na_2Ni(CN)_4$ and in general a catalyst composition of the group consisting of (a) aqueous colloidal sols of a metal of the group consisting of tin, arsenic, copper, molybdenum, nickel, cobalt, and platinum, and (b) alkali metal salts of complex anions of the group consisting of cyanonickelates (II), cyanocobaltate (II), cyanochromate (II), cyanomanganote (II), and their oxidized forms. These catalysts are disclosed by German Pat. No. 1,099,- 506 which corresponds to U.S. Pat. No. 3,118,724, dated Jan. 21, 1964.

Of particular importance for the present invention is the surprisingly good stability of mixed solutions of borohydride and, for instance, $Na_2Ni(CN)_4$, which stability is present up to very high temperatures. Thus, for instance, at 200° C. no substantial decomposition of $NaBH_4$ with formation of $H_2$ takes place as yet. At temperatures below 100° C., the reduction of $Na_2Ni(CN)_4$ even takes place extremely slowly; only upon further increases in temperature is there slowly obtained, with the imparting of a red color to the melt, the reduction which in aqueous concentrated solutions takes place rapidly even at room temperature.

Upon the cooling of $NaOH \cdot H_2O$ with suspended or partially dissolved $NaBH_4$ to less than 60° C., there are produced solids of excellent mechanical properties. The good, i.e., particularly rapid, solubility of the product in cold water is of particular importance; it is surprisingly much better than that of NaOH in cold water. In this connection, it is also important that such dissolving takes place without any decomposition, i.e., formation of $H_2$.

It is by no means necessary for the entire NaOH to be converted into $NaOH \cdot H_2O$. On the contrary, the use of some NaOH in excess affords certain industrial advantages. Thus the eutectic between $NaOH \cdot H_2O$ and NaOH which melts at 62° C. already has the advantage, inter alia, of containing only 34.8 g. $H_2O$ per 100 g. of NaOH, rather than 46.8 g. $H_2O$ per 100 g. NaOH, and thus require less total weight per part by weight of NaOH or $NaBH_4$ and furthermore again improves the stability. It is industrially advantageous to add even somewhat less water than corresponds to the eutectic (see below).

However, on the other hand, there may also be present somewhat more $H_2O$ than corresponds to the monohydrate without impairing the physical and chemical properties excecessively; a product with 56 parts $H_2O$ per 100 parts of NaOH still gives a solid having excellent physical and chemical properties and which melts at 60° C.

Furthermore, it is extremely important that a part of the alkali metal hydroxide can be replaced without disadvantage by silicates or that silicates can be added in addition without disadvantage to the alkali metal hydroxide (see below).

Many other substances may also be present without disadvantage; this is particularly true of salts and is important in connection with the production of the catalyst (see below). Water-insoluble salts may also be present (see below).

Potassium salts, such as $KBH_4$ or $K_2Ni(CN)_4$, behave in principle in the same manner as the sodium salts; the solubility is merely shifted as a function of the temperature.

The full replacement of the NaOH or the $NaOH \cdot H_2O$ by KOH or $KOH \cdot H_2O$, respectively, gives in principle the same results; the main difference here is the higher melting point of the monohydrate (143° C.). Partial replacement of the sodium hydroxide hydrate by potassium hydroxide (hydrate) is also possible; it leads to a eutectic which solidifies somewhat below 60° C.

The present invention therefore consists in the production and use of alkali metal hydroxide monohydrate borohydride mixtures which generally also contain additional substances (for instance NaOH) and, in one particularly important special case, in the preparation of mixtures of alkali metal hydroxide monohydrate with alkali metal borohydride and catalyst which contain generally also other substances and are solids at room temperature.

For the sake of simplicity, the mixtures of the invention which contain catalyst shall be referred to hereinafter as "boralkat" mixtures.

The nature of the catalyst is not of importance in the present invention.

Although only the alkali nickel cyanides are mentioned by name in the present application, this is done only for the sake of simplicity; the subject matter of the invention is in no way to be limited by this simplification.

The use of the "boralkat" mixtures in accordance with the invention satisfies first of all completely the aforementoned industrial desire for a reduction of the number of the components which are necessary, for instance, in vat dyeing by the new method. Thus in the above example the two substances of the old method (60 g./l. $Na_2S_2O_4$ and 60 g./l. NaOH) are now replaced no longer by 4 or at best 3 individual substances or mixtures of substances, but by at most 2 substances or mixtures of substances, namely, 20 g./l. "boralkat" and 8 g./l.

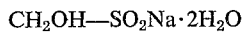

$$CH_2OH—SO_2Na \cdot 2H_2O$$

Furthermore, great advantages result from the fact that the product of the invention is a solid which dissolves in water excellently, rapidly and without decomposition and can be brought in particularly easily into a completely non-dusting and thus especially harmless form.

Advantages of special economic importance result in connection with the possibilities of the preparation of the products of the invention. An intermediate product of the two industrially important methods for the manufacture of sodium borohydride is in one case a mixture of sodium borohydride and sodium methylate and in the other a mixture of sodium borohydride and a silicate of sodium or calcium. From these intermediate products it is industrially cheaper to isolate either aqueous solutions of sodium borohydride and sodium hydroxide or solutions of sodium borohydride and sodium silicate than to isolate sodium borohydride in solid forms.

Both of such solutions constitute an excellent starting material for the products of the invention. They contain about 10 to 12% $NaBH_4$ content and 40 to 50% $H_2O$ content (balance NaOH or $Na_2SiO_3$), just as much water as is necessary to obtain approximately an $NaOH \cdot H_2O$—NaOH eutectic with the amount of alkali present in the solution and additional alkli added as NaOH.

In many cases it is not even necessary first of all to prepare aqueous solutions from the primary products of the boranate synthesis, but primary products can be reacted directly with the required quantity of NaOH and $H_2O$. Due to the surprising excellent stability of the $NaBH_4$ in the molten sodium hydroxide monohydrate, it is, namely, possible to destroy disagreeable accompanying products, such as NaH and excess Si in the crude product of the boranate synthesis without the $NaBH_4$ being attacked.

For many purposes one can also employ directly $CaSiO_3$ containing raw products and tolerate the subsequent water-insolubility of the $CaSiO_3$, since it does not result in any serious disturbances.

For the preparation of the "boralkat" mixtures, the catalyst can, for example, be added to the borohydride-alkali metal hydroxide monohydrate melts or, prior to the addition of the main quantity of NaOH, the catalyst can be brought together with a part of the alkali, the borohydride and the water jointly into solution or suspension, and then only the main quantity of NaOH added. One can even produce the catalyst in the presence of borohydride and part of the alkali metal hydroxide in the presence of water and then add the balance of the alkali metal hydroxide.

It is not necessary to add the catalyst in pure form; there is, for instance, no disadvantage whatsoever in using the reaction product of the reaction between NaCN and $NiCl_2$ without any separation of the NaCl.

The production can be effected above the melting point of the monohydrate of the alkali hydroxides or eutectics, in which case, then there are first obtained melts in which the other components are partially dissolved and partially suspended.

It can, however, also take place below the melting point. This corresponds to a sintering process which naturally proceeds more slowly, the speed depending not only on the temperature but in particular on the particle size of the NaOH used.

The melting point of the mixture of the invention within the region of somewhat above 60° C.—which is very favorable for industrial purposes—opens up the most diversified possibilities of bringing the solidifying melts or the sintered product by mechanical means into a non-dusting commercial form which, even in case of a slight absorption of moisture by the product from the air, has little tendency to bake together. They may be lumps, irregular scales, regular scales, pellets, eggs, granulates or solids of other shape. As is known, industry offers a huge number of possibilities for this.

The preferred form of use for the final consumer is the use of a relative dilute aqueous solution of the mixtures of the invention.

Of particular interest in this connection is the use of the "boralkat" mixtures for the reduction of vat dyestuffs by preparing dilute aqueous solutions of the "boralkat" mixtures and using them for the vatting of the dyes or other fields.

The quantity proportions of the components of the mixtures of materials of the invention can be varied within the widest limits without the essence of the invention being thereby affected.

The present invention primarily utilizes the surprising excellent properties of alkali-hydroxide-monohydrates in the presence of borohydrides. In order that they can be utilized, there is required merely its presence in a minimum amount of about 10 to 20% by weight. Whether, on the other hand, the borohydride content amounts, for instance, to 1% or 50% depends on the intended purpose of use.

EXAMPLE 1

A solution which contains in detail:

|  | g. |
|---|---|
| $NaBH_4$ | 6.0 |
| $NaOH$ | 20.0 |
| $H_2O$ | 24.0 |
|  | 50.0 | is present in a beaker. 55 g. of NaOH are added in the form of pellets and heating then effected with agitation (10° C./min.). Starting at 100° C., the NaOH dissolves in clearly perceptible manner and at the same time some $NaBH_4$ starts to precipitate.

At 130° C., all the NaOH has dissolved; the $NaBH_4$ which is still precipitated is dissolved again completely at about 150° C. The temperature is increased to 200° C. and it is then noted, how during the entire rest of the time, there is no liberation of $H_2$ or other decomposition. The mixture is cooled rapidly to about 70° C., a slurry being produced as a result of the precipitation of the $NaBH_4$.

After stirring, it is poured into a polyethylene mold which can be hermetically closed and allowed to cool there.

The resultant solid can be removed excellently as a unit from the mold. It is very hard and brittle. A fragment of approximately cube shape and a weight of 1.0 g. dissolves in 90 seconds in water of 20° C.

No concentrating of $NaBH_4$ at any point of the solidified melt can be detected. To the naked eye, the solidified melt appears homogenous.

EXAMPLE 2

Into a solution which contains in detail:

|  | g. |
|---|---|
| $NaBH_4$ | 6.0 |
| $NaOH$ | 20.0 |
| $H_2O$ | 24.0 |
|  | 50.0 | there are added, dry, 4.0 g./l. $Na_2Ni(CN)_4$, they being stirred in the solution until a uniform suspension is obtained.

Thereupon 66 g. of NaOH in pellet form are added and the mixture is heated with agitation. Above 100° C., the dissolving of the NaOH can be readily noted; starting with 130° C., catalyst and precipitated borohydride start to dissolve rapidly and a clear solution has formed at 150° C. At the same time, the reduction takes place with the formation of the dark reddish brown color. No $H_2$ is liberated even upon heating to 200° C.

Upon cooling, there is again obtained a slurry which is poured at about 70° C. as above into a mold and behaves otherwise in the same manner as the product in accordance with Example 1.

From this product, a solution of 20 g./l. in water is prepared.

A part of the solution is treated with 8 g./l. $CH_2OH-SO_2Na \cdot 2H_2O$ and tested in comparison with a solution of 60 g./l. $Na_2S_2O_4$ and 60 g./l. as reducing agent for the steam development of 27 different paddings of vat dyestuffs with 5 different steaming times.

In this connection, the solution of the example proves to be the better reducing agent.

A further portion of the solution remains, at an average temperature of 22° C., open in the air for 8 days and is also treated with 8 g./l. $CH_2 \cdot OH-SO_2Na \cdot 2H_2O$ and tested in comparison with the above solutions.

The result is just as good as in the case of the fresh solution.

I claim:

1. A solid alkali metal borohydride dispersed in a water-soluble matrix consisting essentially of an alkali metal hydroxide monohydrate selected from the group consisting of sodium and potassium hydroxide monohydrate, the amount of alkali metal borohydride being between 1 and 50 percent by weight, the composition being stable at a temperature up to at least 150° C.

2. The composition as claimed in claim 1 wherein said matrix also includes an excess of alkali metal hydroxide, said excess being not substantially greater than that required to form the eutectic between the alkali metal hydroxide and the alkali metal hydroxide monohydrate.

3. The composition as claimed in claim 1 wherein said matrix includes water in excess of that required to form the alkali metal hydroxide monohydrate, the total amount of water being not substantially greater than about 56 parts for each 100 parts of alkali metal hydroxide by weight.

4. The composition as claimed by claim 1 wherein the alkali metal hydroxide monohydrate is sodium hydroxide monohydrate.

5. The composition as claimed by claim 1 wherein the alkali metal borohydride is sodium borohydride.

6. The composition as claimed by claim 1 wherein said matrix also includes a catalyst for use with borohydrides in the reduction of vat dyestuffs, said catalyst being selected from the group consisting of
    (a) aqueous colloidal sols of a metal of the group consisting of tin, arsenic, copper, molybdenum, nickel, cobalt and platinum, and
    (b) alkali metal salts of complex anions of the group consisting of cyanonickelates (II), cyanocobaltate (II), cyanochromate (II), cyanomanganate (II), and then oxidized forms.

7. The composition as claimed by claim 6 wherein the catalyst is an alkali metal nickel cyanide.

References Cited

UNITED STATES PATENTS

| 3,000,688 | 9/1961 | Schubert | 252—188 |
| 3,118,724 | 1/1964 | Goerrig et al. | 8—34 |
| 3,273,955 | 9/1966 | Goerrig et al. | 252—188 |
| 3,405,068 | 10/1968 | Hiltz | 252—188 |

RICHARD D. LOVERING, Primary Examiner

I. GLUCK, Assistant Examiner

U.S. Cl. X.R.

8—34; 23—59, 149, 186